(No Model.) 2 Sheets—Sheet 1.

J. T. KING.
REVOLVING FRAME.

No. 391,800. Patented Oct. 30, 1888.

WITNESSES
H. C. Newman,
E. J. Newman,

INVENTOR,
John T. King.
By his Attorney,
Marcus S. Hopkins.

(No Model.) 2 Sheets—Sheet 2.
J. T. KING.
REVOLVING FRAME.
No. 391,800. Patented Oct. 30, 1888.
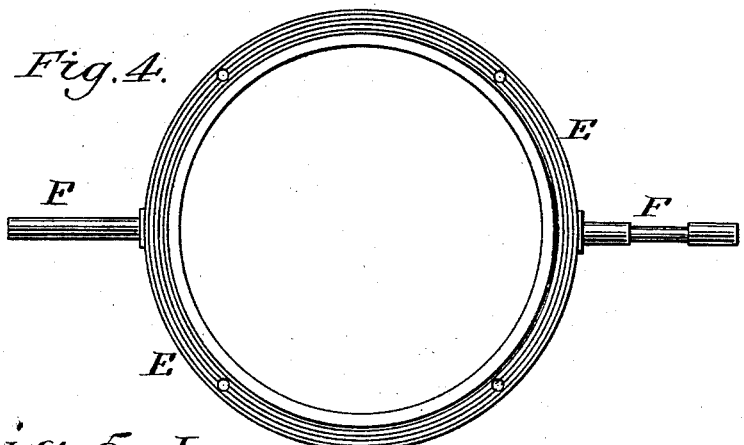
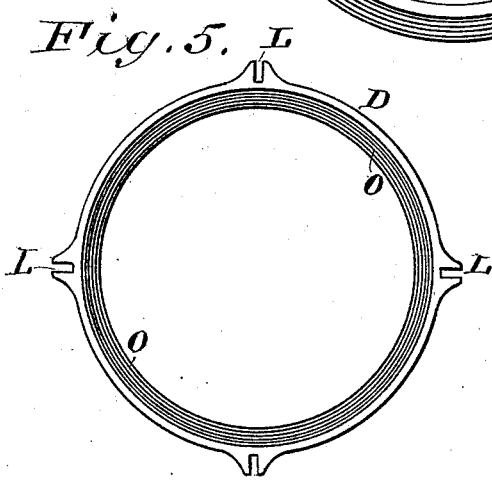
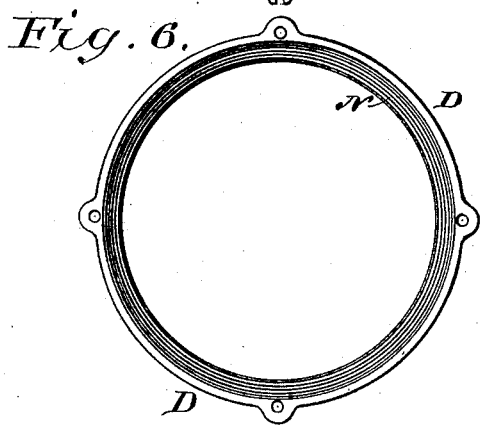
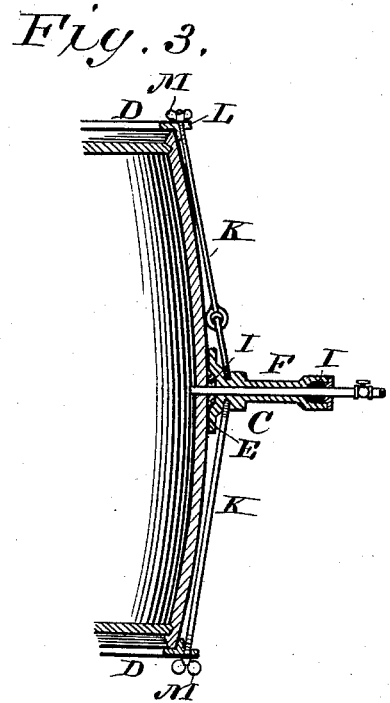
WITNESSES,
H. C. Newman,
E. S. Newman.
INVENTOR.
John T. King.
By his Attorney
Marcus S. Hopkins.

UNITED STATES PATENT OFFICE.

JOHN T. KING, OF MADISON, WISCONSIN.

REVOLVING FRAME.

SPECIFICATION forming part of Letters Patent No. 391,800, dated October 30, 1888.

Application filed May 15, 1888. Serial No. 273,976. (No model.)

*To all whom it may concern:*

Be it known that I, JOHN T. KING, of Madison, in the county of Dane and State of Wisconsin, have invented certain new and useful Improvements in Revolving Frames, of which the following is a specification, reference being had to the accompanying drawings.

The object of my invention is to produce a frame that will receive and carry a body which it is desirable to revolve rapidly, such as a barrel or other vessel containing starch or cream or other substance to be agitated by rapid rotation. It is desirable to have and accordingly I have provided means for quickly loading and unloading the revolving frame with the vessel to be revolved within it. I have also provided means to be used, when necessary, for admitting steam within the vessel to be revolved; but that I do not claim as essential to my invention.

Figure 1:
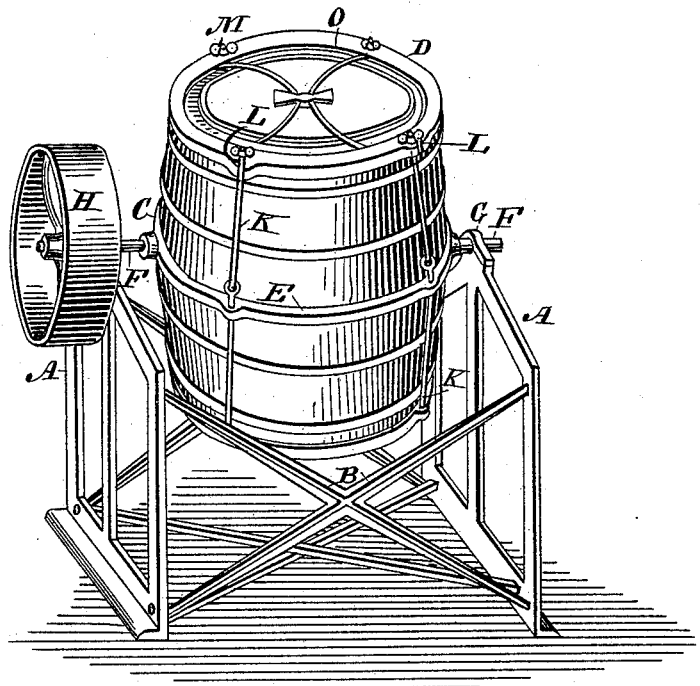
Figure 2:
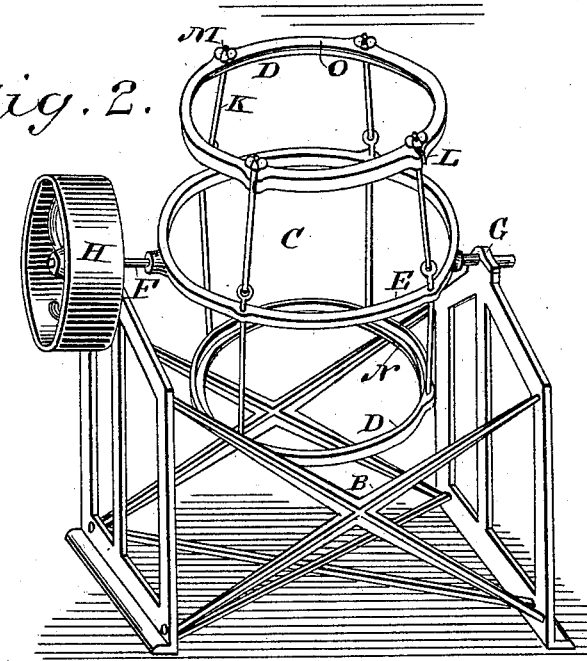

In the accompanying drawings, illustrating my apparatus, Figure 1 is a perspective view showing a barrel secured within the rotating frame—that is to say, the rotating frame being loaded. Fig. 2 is another perspective view of the frame not loaded. Fig. 3 is a view showing details of mechanism for admitting steam into a vessel to be rotated; but I do not claim these details as any part of my invention, although sometimes it may be desirable to admit steam into vessels containing starch or other substances; but my invention relates to the improved construction of apparatus for rotating vessels. Fig. 4 is a top or plan view of the center ring provided with journals. Figs. 5 and 6 are views of the end rings, being similar, except that Fig. 5 shows slots in the ring-lugs, and Fig. 6 shows holes through them.

Referring to the letters upon the drawings, A indicates a suitable light strong frame, preferably provided with cross-braces B, as illustrated; but the form of this frame may be varied at will.

C indicates the rotary carrier, composed of end rings, D D, and center ring, E, the center ring being provided with journals F, resting in suitable ordinary journal-bearings, G, on the main frame A.

H indicates a band-pulley secured to one of the journals of the center ring and adapted to revolve the carrier when power is applied in the usual way. The other journal, as illustrated in Fig. 3, may be hollow to admit a steam-pipe provided with suitable ordinary packings, I.

What I call the "lower end ring" is shown in Fig. 6, and what I call the "upper end ring" is shown in Fig. 5; but the form shown in Fig. 5 might be used for both end rings. It is preferable, however, to use it for what I call the "top ring," where the vessel to be rotated is to be received, because it is very easy to detach the rods K from the slots L and to take off the ring for loading the frame. When rings such as shown in Fig. 5 are used for both ends of the rotating frame, they should have thumb-nuts M to secure them in place at both ends, as shown in Fig. 3; but when a bottom ring is like that shown in Fig. 6 then thumb-nuts are only necessary in the top ring, as shown in Figs. 1 and 2. The rods are screwed into or otherwise secured in the center ring, as plainly shown in Fig. 3. By unscrewing the top thumb-nuts the top ring can be quickly removed, and a barrel or other vessel can be supported by the bottom ring, which has an annular inwardly-projecting flange, N, serving as a seat for the vessel. Then the top ring can be put in place, its flange O serving to clamp over and hold down the vessel, and the thumb-nuts can be screwed down so as to clamp the flange of the top ring against the vessel forming the load and hold it securely. I prefer to form joints, as shown, in the upper rods, K. Then, power being applied through the band-pulley or other suitable ordinary gearing, the load may be revolved rapidly, and when the object of its revolution and the agitation of the contents of the vessel are accomplished the top thumb-nuts can be unscrewed and the top ring taken off and the vessel quickly removed.

This device is exceedingly useful for churning, for agitating vessels containing starch, and for various other purposes.

While my carrier is shown as cylindrical, and that is the preferable form, it may be made in any other form to suit the configuration of different vessels.

What I claim as new, and desire to secure by Letters Patent of the United States, is—

1. In a rotary carrier, the combination of the end rings, D D, the center ring, E, provided with journals F, and the holding-rods K, substantially as set forth.

2. In a rotary carrier, the combination of the end rings, D D, provided with the inwardly-projecting annular flanges N and O, the center ring, E, provided with journals F, and the rods K and thumb-nuts M, substantially as set forth.

In testimony of all which I have hereunto subscribed my name.

JOHN T. KING.

Witnesses:
W. G. WALKER,
L. M. CRAIG.